US012770278B2

(12) United States Patent
Wang et al.

(10) Patent No.: US 12,770,278 B2
(45) Date of Patent: Oct. 20, 2026

(54) IMAGE REGISTRATION METHOD AND DEVICE, AND ORTHOPEDIC SURGERY NAVIGATION SYSTEM BASED ON IMAGE REGISTRATION

(71) Applicant: TINAVI MEDICAL TECHNOLOGIES CO., LTD., Beijing (CN)

(72) Inventors: Junliang Wang, Beijing (CN); Cheng Zhu, Beijing (CN)

(73) Assignee: TINAVI MEDICAL TECHNOLOGIES CO., LTD., Beijing (CN)

( * ) Notice: Subject to any disclaimer, the term of this patent is extended or adjusted under 35 U.S.C. 154(b) by 293 days.

(21) Appl. No.: 18/751,214

(22) Filed: Jun. 22, 2024

(65) Prior Publication Data

US 2025/0104258 A1 Mar. 27, 2025

Related U.S. Application Data

(63) Continuation of application No. PCT/CN2023/137404, filed on Dec. 8, 2023.

(30) Foreign Application Priority Data

Sep. 27, 2023 (CN) ........................ 202311261690.1

(51) Int. Cl.
*G06T 7/33* (2017.01)

(52) U.S. Cl.
CPC ...... *G06T 7/33* (2017.01); *G06T 2207/10116* (2013.01); *G06T 2207/30008* (2013.01)

(58) Field of Classification Search
CPC . G06T 2207/10116; G06T 19/00; G06T 7/30; G06T 2207/10081; G06V 20/64; A61B 34/20; A61B 90/00
See application file for complete search history.

(56) References Cited

U.S. PATENT DOCUMENTS

2004/0215071 A1* 10/2004 Frank .................. A61B 6/4441 600/407
2023/0154021 A1* 5/2023 Lin ........................ A61B 34/10 382/131
2024/0144498 A1* 5/2024 Woo ....................... A61B 34/20

FOREIGN PATENT DOCUMENTS

CN 111281540 A 6/2020
CN 111429491 A 7/2020
(Continued)

OTHER PUBLICATIONS

Chang CJ, Lin GL, Tse A, Chu HY, Tseng CS. Registration of 2D C-Arm and 3D CT Images for a C-Arm Image-Assisted Navigation System for Spinal Surgery. Appl Bionics Biomech. 2015;2015:478062. doi: 10.1155/2015/478062. Epub May 28, 2015. PMID: 27018859; PMCID: PMC4745431 (Year: 2015).*
(Continued)

*Primary Examiner* — Chan S Park
*Assistant Examiner* — Chandhana Pedapati
(74) *Attorney, Agent, or Firm* — JEEN IP LAW, LLC

(57) ABSTRACT

An image registration method, device, and orthopedic surgery navigation system based on image registration. The method comprises: generating an initial object posture of an object to be registered, and an initial front posture and an initial lateral posture of an X-ray machine; performing registration optimization for the initial object posture to generate a target object posture of the object to be registered; performing registration optimization for the initial lateral posture of the X-ray machine to generate a registered target lateral posture; and integrating the target object posture of the object to be registered, the target lateral posture of the X-ray machine, and the initial front posture of the X-ray machine into a registration optimization result. the method, device and system can optimize the object posture, and accurately register the lateral posture of the X-ray machine
(Continued)

even is its position is inaccurate, improve the accuracy and usability of the registration method.

11 Claims, 7 Drawing Sheets

(56) References Cited

FOREIGN PATENT DOCUMENTS

| | | | |
|---|---|---|---|
| CN | 112233155 | A | 1/2021 |
| CN | 114821031 | A | 7/2022 |
| CN | 115137481 | A | 10/2022 |
| WO | 2023089566 | A1 | 5/2023 |

OTHER PUBLICATIONS

Naik, R. R., Hoblidar, A., Bhat, S. N., Ampar, N., & Kundangar, R. (2022). A Hybrid 3D-2D Image Registration Framework for Pedicle Screw Trajectory Registration between Intraoperative X-ray Image and Preoperative CT Image. Journal of Imaging, 8(7), 185. https://doi.org/10.3390/jimaging8070185 (Year: 2022).*

* cited by examiner

IMAGE REGISTRATION METHOD AND DEVICE, AND ORTHOPEDIC SURGERY NAVIGATION SYSTEM BASED ON IMAGE REGISTRATION

CROSS-REFERENCE TO RELATED APPLICATIONS

This application is a continuation of co-pending International Patent Application No. PCT/CN2023/137404, filed on Dec. 8, 2023, which claims the priority and benefit of Chinese patent application number 202311261690.1, filed on Sep. 27, 2023 with China National Intellectual Property Administration, the entire contents of which are incorporated herein by reference.

TECHNICAL FIELD

The present application relates to the technical field of medical imaging, in particular to an image registration method, an image registration device, and an orthopedic surgery navigation system based on image registration.

BACKGROUND

Presently, robot-assisted spinal surgery has been widely applied clinically. A navigation system is a key part of robot-assisted spinal surgery. In the prior art, robot-assisted spinal navigation mainly includes the following methods: (1) a navigation imaging method based on a two-dimensional C-arm X-ray machine; (2) an intraoperative navigation imaging method based on three-dimensional C-arm images; and (3) a navigation imaging method based on preoperative three-dimensional CT reconstruction and planning. Among these methods, the navigation imaging method based on a two-dimensional C-arm X-ray machine is applied the most widely, but it is not intuitive enough and results in a low operation efficiency; the intraoperative navigation image method based on three-dimensional C-arm images has unsatisfactory image quality, high price and a low equipment application rate; the navigation imaging method based on preoperative three-dimensional CT reconstruction and planning can't be used to perform surgery accurately without an intraoperative spatial positioning algorithm.

A navigation imaging method based on two-dimensional/three-dimensional registration and preoperative three-dimensional CT reconstruction and planning can avoid the above problems, but it requires high two-dimensional/three-dimensional registration accuracy to meet clinical needs.

SUMMARY

In view of the problems existing in the prior art, the present application proposes an image registration method and an image registration device, in which an initial object posture is obtained from a three-dimensional image, a front two-dimensional image, a lateral two-dimensional image, and internal parameters of an X-ray machine, and the initial object posture and the lateral posture of the X-ray machine are optimized according to the front two-dimensional image and the lateral two-dimensional image to obtain a target object posture of the object to be registered and an optimized lateral posture. According to the scheme proposed by the present application, not only the object posture can be optimized, but also the lateral posture of the X-ray machine can be optimized in the case that the position of the X-ray machine is inaccurate, so that the accuracy and usability of the registration method are improved.

According to a first aspect of the present application, an image registration method is proposed, which may comprise the following steps: generating an initial object posture of an object to be registered, and an initial front posture and an initial lateral posture of an X-ray machine according to a three-dimensional image, a front two-dimensional image and a lateral two-dimensional image of the object to be registered and internal parameters of the X-ray machine; performing registration optimization for the initial object posture according to the front two-dimensional image and the lateral two-dimensional image to generate a target object posture of the object to be registered; performing registration optimization for the initial lateral posture of the X-ray machine according to the target object posture and the lateral two-dimensional image to generate a registered target lateral posture of the X-ray machine; and integrating the target object posture of the object to be registered, the target lateral posture of the X-ray machine, and the initial front posture of the X-ray machine into a registration optimization result.

According to some embodiments, performing registration optimization for the initial lateral posture of the X-ray machine according to the target object posture and the lateral two-dimensional image to generate a registered target lateral posture of the X-ray machine may comprise the following steps: generating a first virtual object posture according to the target object posture and the lateral two-dimensional image; and generating the registered target lateral posture of the X-ray machine according to a relative position relation between the first virtual object posture and the lateral two-dimensional image.

According to some embodiments, generating a first virtual object posture according to the target object posture and the lateral two-dimensional image may comprise the following steps: S201: taking the target object posture as a current object posture; S202: generating a first virtual lateral two-dimensional image corresponding to the current object posture; S203: calculating a first degree of similarity between the lateral two-dimensional image and the first virtual lateral two-dimensional image; S204: taking the current object posture as the first virtual object posture if the first degree of similarity meets a first object posture condition; and S205: adjusting the current object posture and returning to step S202 if the first degree of similarity doesn't meet the first object posture condition.

According to some embodiments, performing registration optimization for the initial object posture according to the front two-dimensional image and the lateral two-dimensional image to generate a target object posture of the object to be registered may comprise: generating a first temporary object posture according to the initial object posture, the front two-dimensional image and the lateral two-dimensional image; and generating the target object posture according to the first temporary object posture and the front two-dimensional image.

According to some embodiments, generating a first temporary object posture according to the initial object posture, the front two-dimensional image and the lateral two-dimensional image may comprise: S301: taking the initial object posture as the current object posture; S302: generating a second virtual front two-dimensional image and a second virtual lateral two-dimensional image corresponding to the current object posture; S303: calculating a second degree of similarity between the front two-dimensional image and the second virtual front two-dimensional image and a third degree of similarity between the lateral two-dimensional image and the second virtual lateral two-dimensional image; S304: taking the current object posture as the first temporary object posture if the second degree of similarity and the third degree of similarity meet a second object posture condition; and S305: adjusting the current object posture and returning to step S302 if the second degree of similarity and the third degree of similarity don't meet the second object posture condition.

According to some embodiments, generating the target object posture according to the first temporary object posture and the front two-dimensional image may comprise: S401: taking the first temporary object posture as the current object posture; S402: generating a third virtual front two-dimensional image corresponding to the current object posture; S403: calculating a fourth degree of similarity between the front two-dimensional image and the third virtual front two-dimensional image; S404: taking the current object posture as the target object posture if the fourth degree of similarity meets a third object posture condition; and S405: adjusting the current object posture and returning to step S402 if the fourth degree of similarity doesn't meet the third object posture condition.

According to some embodiments, adjusting the object posture may comprise: performing a rotating or translating manipulation on the posture of the object to be registered.

According to a second aspect of the present application, an image registration device is proposed, which may comprise an initial posture generation module, a target object posture generation module, a target lateral posture generation module, and a registration result integration module, wherein: the initial posture generation module may be configured for generating an initial object posture of an object to be registered, and an initial front posture and an initial lateral posture of an X-ray machine according to a three-dimensional image, a front two-dimensional image and a lateral two-dimensional image of the object to be registered and internal parameters of the X-ray machine; the target object posture generation module may be configured for performing registration optimization for the initial object posture according to the front two-dimensional image and the lateral two-dimensional image to generate a target object posture of the object to be registered; the target lateral posture generation module may be configured for performing registration optimization for the initial lateral posture of the X-ray machine according to the target object posture and the lateral two-dimensional image to generate a registered target lateral posture of the X-ray machine; and the registration result integration module may be configured for integrating the target object posture of the object to be registered, the target lateral posture of the X-ray machine, and the initial front posture of the X-ray machine into a registration optimization result.

According to a third aspect of the present application, an orthopedic surgery navigation system based on image registration is proposed, which may comprise: a three-dimensional CT device that can be used to take a three-dimensional image of a site to be operated; an X-ray machine that can be used to take a front two-dimensional image and a lateral two-dimensional image of the site to be operated and provide internal parameters of the X-ray machine to a processing module; the processing module, which can be used to determine a surgical operation plan according to the three-dimensional image; with the method described in the first aspect of the present application, generate a registration optimization result according to the three-dimensional image, the front two-dimensional image, the lateral two-dimensional image, and the internal parameters of the X-ray machine, wherein the registration optimization result includes a target object posture of the object to be registered, a target lateral posture of the X-ray machine, and an initial front posture of the X-ray machine; transform coordinates of the surgical operation plan from a CT image coordinate system to a patient coordinate system according to the target object posture; transform the coordinates of the surgical operation plan from the patient coordinate system to a three-dimensional coordinate system of the X-ray machine according to the target lateral posture and the initial front posture; and transform the coordinates of the surgical operation plan from the three-dimensional coordinate system of the X-ray machine to a front X-ray two-dimensional coordinate system and a lateral X-ray two-dimensional coordinate system according to the internal parameters of the X-ray machine; and a manipulating robot that can be used to manipulate the site to be operated according to the surgical operation plan.

According to a fourth aspect of the present application, an electronic device is proposed, which may comprise: a processor; and a memory storing a computer program, which, when executed by the processor, instructs the processor to perform the method according to the first aspect of the present application.

According to a fifth aspect of the present application, a non-transitory computer-readable storage medium is proposed. The non-transitory computer-readable storage medium stores computer-readable instructions, which, when executed by a processor, instructs the processor to perform the method as described in the first aspect of the present application.

The scheme proposed by the present application not only takes account of optimization of the object posture, but also takes account of optimization of the lateral posture of the X-ray machine. According to the scheme proposed by the present application, in the case that the actual position of the X-ray machine is different from a calculated theoretical position, accurate image registration can still be achieved by optimizing the posture of the X-ray machine, thereby the usability and accuracy of image registration are improved. Besides, the orthopedic surgery navigation system proposed by the present application utilizes the image registration method proposed by the present application to carry out registration, so as to improve the accuracy of registration and achieve intraoperative spatial positioning more accurately, thereby the surgery can be accurately performed to meet clinical needs.

BRIEF DESCRIPTION OF DRAWINGS

To explain the technical scheme in the embodiments of the present application more clearly, the drawings to be used in the description of the embodiments will be introduced briefly below. Obviously, the drawings used in the description below only illustrate some embodiments of the present application, and those having ordinary skills in the art can work out other drawings based on these drawings without departing from the scope of protection of the present application.

DESCRIPTION OF EMBODIMENTS

The technical scheme in the embodiments of the present application will be detailed below clearly and completely with reference to the accompanying drawings of the embodiments. Obviously, the embodiments described herein are only some embodiments of the present application, but not all possible embodiments of the present application. Those skilled in the art can obtain other embodiments based on the embodiments provided herein without expending any creative labor; however, all those embodiments shall be deemed as falling in the scope of protection of the present application.

Figure 1:
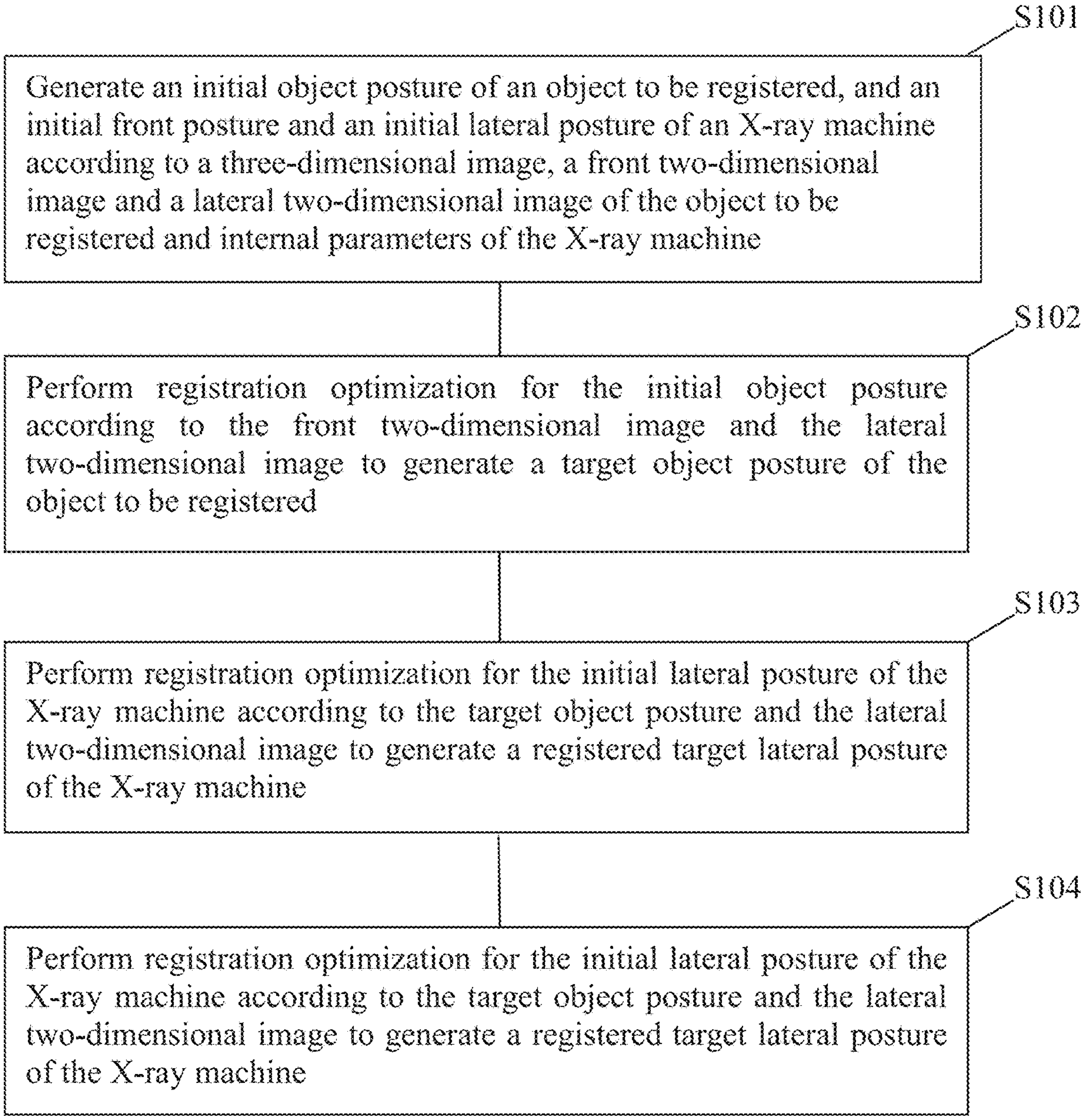
FIG. 1 is a flowchart of an image registration method in the present application.

FIG. 1 is a flowchart of an image registration method in the present application. As shown in FIG. 1, the method comprises the following steps:

In some specific embodiments, the X-ray machine is a C-arm X-ray machine. The method proposed by the present application will be described in detail in an example of a C-arm X-ray machine.

Step S101: generating an initial object posture of an object to be registered, and an initial front posture and an initial lateral posture of a C-arm X-ray machine according to a three-dimensional image, a front two-dimensional image and a lateral two-dimensional image of the object to be registered and internal parameters of the C-arm X-ray machine;

In some specific embodiments, the three-dimensional image is a three-dimensional CT image taken before the surgery. The three-dimensional image includes a named field of the object to be registered and corresponding three-dimensional image guidance information, wherein the coordinates of points in the three-dimensional image are in a CT image coordinate system. In some specific embodiments, the two-dimensional images are X-ray image taken by the C-arm X-ray machine during the operation, and the two-dimensional images include a front two-dimensional image and a lateral two-dimensional image. The front two-dimensional image and the lateral two-dimensional image respectively include a corresponding naming field and two-dimensional image guidance information of the object to be registered in a front position and a lateral position, wherein the coordinates of points in the front two-dimensional image and the lateral two-dimensional image are in an X-ray two-dimensional coordinate system. In some specific embodiments, the object posture of the object to be registered is a transformation matrix of the coordinates of the object to be registered from a CT image coordinate system to a patient coordinate system.

In some specific embodiments, the C-arm X-ray machine is used to take a front two-dimensional image and a lateral two-dimensional image during the operation. The internal parameters of the C-arm X-ray machine include a focal length of the C-arm X-ray machine, and horizontal and vertical coordinates of a viewpoint center of the C-arm X-ray machine in the X-ray image taken, wherein the horizontal and vertical coordinates refer to the coordinates in the X-ray two-dimensional coordinate system. In some specific embodiments, external parameters of the C-arm X-ray machine are calculated with a PNP (Perspective-n-Point) algorithm according to the three-dimensional image, the front two-dimensional image, the lateral two-dimensional image, and the internal parameters of the C-arm X-ray machine, and the external parameters of the C-arm X-ray machine include an initial front posture and an initial lateral posture of the C-arm X-ray machine. In some specific embodiments, a transformation matrix from the CT image coordinate system to the three-dimensional coordinate system of the X-ray machine is determined according to the three-dimensional image guidance information and the two-dimensional image guidance information of the object to be registered. In some specific embodiments, an initial object posture of the object to be registered is obtained according to the transformation matrix from the CT image coordinate system to the three-dimensional coordinate system of the X-ray machine, the external parameters of the C-arm X-ray machine, and the internal parameters of the C-arm X-ray machine.

Step S102: performing registration optimization for the initial object posture according to the front two-dimensional image and the lateral two-dimensional image to generate a target object posture of the object to be registered;

In some specific embodiments, a first temporary object posture is generated according to the initial object posture, the front two-dimensional image and the lateral two-dimensional image, and a virtual front two-dimensional image and a virtual lateral two-dimensional image corresponding to the initial object posture are generated with a DRR (Digitally Reconstructed Radio-Graphs) method. Optionally, the DRR method is realized specifically by means of line integral. In some specific embodiments, a second degree of similarity between the virtual front two-dimensional image and the front two-dimensional image that are generated with the DRR method and a third degree of similarity between the virtual lateral two-dimensional image and the lateral two-dimensional image are calculated. In some specific embodiments, if the second degree of similarity and the third degree of similarity don't meet a second object posture condition, the object posture is adjusted, and a virtual front two-dimensional image and a virtual lateral two-dimensional image corresponding to the adjusted object posture are regenerated, and the degrees of similarity are recalculated; if the second degree of similarity and the third degree of similarity meet the second object posture condition, the current object posture of the object to be registered is taken as the first temporary object posture. Optionally, the second object posture condition is that a difference between two adjacent iterations of the second degree of similarity is greater than a preset threshold of second degree of similarity and a difference between two adjacent iterations of the third degree of similarity is greater than a preset threshold of third degree of similarity.

In some specific embodiments, a target object posture is generated according to the first temporary object posture and the front two-dimensional image. A third virtual front two-dimensional image corresponding to the first temporary object posture is generated with the DRR method, and a fourth degree of similarity between the third virtual front two-dimensional image and the front two-dimensional image is calculated. In some specific embodiments, if the fourth degree of similarity doesn't meet a third object posture condition, the first temporary object posture is adjusted, a third virtual front two-dimensional image corresponding to the adjusted first temporary object posture is regenerated, and a fourth degree of similarity between the adjusted third virtual front two-dimensional image and the front two-dimensional image is calculated; if the fourth degree of similarity meets the third object posture condition, the current first temporary object posture is taken as the target object posture. Optionally, the third object posture condition is that a difference between two adjacent iterations of the fourth degree of similarity is greater than a preset threshold of fourth degree of similarity.

Step S103: performing registration optimization for the initial lateral posture of the C-arm X-ray machine according to the target object posture and the lateral two-dimensional image to generate a registered target lateral posture of the C-arm X-ray machine;

In some specific embodiments, an initial lateral posture of the C-arm X-ray machine is calculated with the PNP (Perspective-n-Point) algorithm according to the lateral two-dimensional image of the C-arm X-ray machine. A first virtual object posture is generated according to the target object posture and the initial lateral posture of the C-arm X-ray machine, a first virtual lateral two-dimensional image corresponding to the first virtual object posture is generated with the DRR method, and a first degree of similarity between the first virtual lateral two-dimensional image and the lateral two-dimensional image is calculated. In some specific embodiments, if the first degree of similarity doesn't meet a first object posture condition, the target object posture is adjusted, a first virtual lateral two-dimensional image corresponding to the adjusted object posture is regenerated, and a first degree of similarity between the adjusted first virtual lateral two-dimensional image and the lateral two-dimensional image is calculated; if the first degree of similarity meets the first object posture condition, the current object posture is taken as the first virtual object posture. Optionally, the first object posture condition is that a difference between two adjacent iterations of the first degree of similarity is greater than a preset threshold of first degree of similarity.

In some specific embodiments, a registered target lateral posture is generated according to a relative position relation between the first virtual object posture and the lateral two-dimensional image, a first transitional posture is generated according to the first virtual object posture, and an inversion operation is performed on the first virtual object posture, and the obtained inversion is taken as the first transitional posture.

In some specific embodiments, an initial lateral posture of the C-arm X-ray machine is calculated with the PNP algorithm, and the first transitional posture is multiplied by the current initial lateral posture of the C-arm X-ray machine to obtain a registered target lateral posture of the C-arm X-ray machine. In some specific embodiments, there is a relative position relation between the first virtual object posture and the initial lateral posture. The lateral posture of the C-arm X-ray machine is calculated when the object posture remains the target posture according to the relative position relation, and the current lateral posture is determined as the target lateral posture of the C-arm X-ray machine.

Step S104: integrating the target object posture of the object to be registered, the target lateral posture of the C-arm X-ray machine, and the initial front posture of the C-arm X-ray machine into a registration optimization result.

In some specific embodiments, in the step S104, the target object posture of the object to be registered is the transformation matrix of coordinates from the CT image coordinate system to the patient coordinate system after registration optimization. The target lateral posture and the initial front posture of the C-arm X-ray machine are the transformation matrix of coordinates from the patient coordinate system to the three-dimensional coordinate system of the X-ray machine after registration optimization. In some specific embodiments, in the step S104, the target object posture of the object to be registered, the target lateral posture of the C-arm X-ray machine, and the initial front posture of the C-arm X-ray machine are integrated to generate a registration optimization result, which is provided for the follow-up operator to operate.

According to the embodiment shown in FIG. 1, in the method proposed by the present application, in the step S101, an initial object posture of the object to be registered is determined; in the step S102, registration optimization is performed for the initial object posture of the object to be registered to obtain a target object posture, i.e., a transformation matrix of coordinates from a CT image coordinate system to a patient coordinate system, thereby the accuracy is improved in the process of transforming the coordinates of points on the object to be registered from the CT image coordinate system to the patient coordinate system; in the step S103, registration optimization is performed for the lateral posture of the C-arm X-ray machine, thereby the accuracy of transforming the coordinates of points on the object to be registered from the patient coordinate system to a three-dimensional coordinate system of the C-arm X-ray machine is improved; in the step S104, integration is performed for the registration optimization result, so that the registration optimization result can be used conveniently for the subsequent operations.

The scheme proposed by the present application not only takes account of optimization of the object posture, but also takes account of optimization of the lateral posture of the C-arm X-ray machine. According to the scheme proposed by the present application, in the case that the actual position of the C-arm X-ray machine is different from a calculated theoretical position, accurate image registration can still be achieved by optimizing the posture of the C-arm X-ray machine, thereby the usability and accuracy of image registration are improved.

Figure 2:
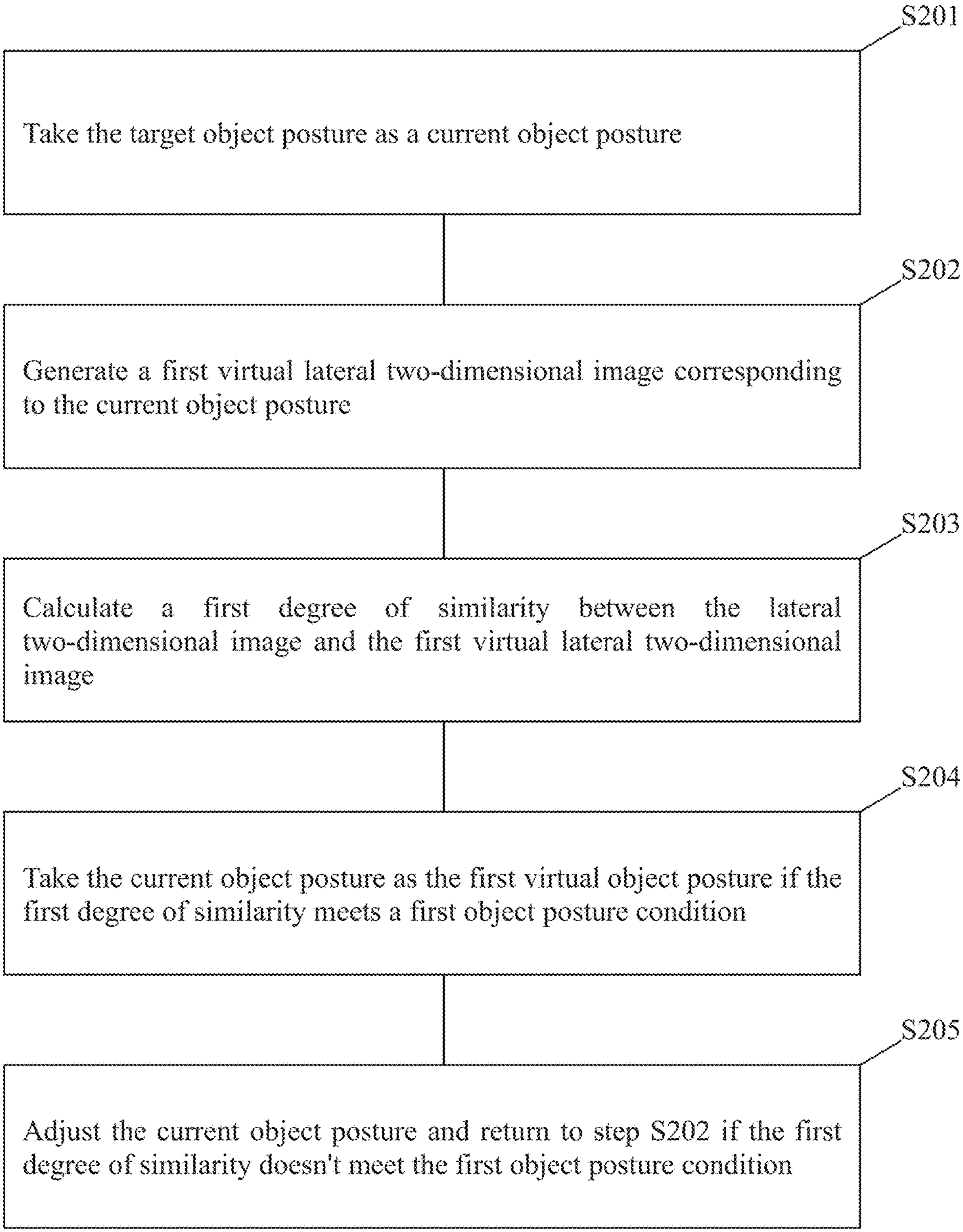
FIG. 2 is a flowchart of generating a first virtual object posture according to the target object posture and the lateral two-dimensional image in the image registration method in the present application.

FIG. 2 is a flowchart of generating a first virtual object posture according to the target object posture and the lateral two-dimensional image in the image registration method in the present application. As shown in FIG. 2, generating a first virtual object posture according to the target object posture and the lateral two-dimensional image may comprise the following steps:

S201: taking the target object posture as a current object posture;

S202: generating a first virtual lateral two-dimensional image corresponding to the current object posture;

S203: calculating a first degree of similarity between the lateral two-dimensional image and the first virtual lateral two-dimensional image;

S204: taking the current object posture as the first virtual object posture if the first degree of similarity meets a first object posture condition;

In some specific embodiments, an initial lateral posture of the C-arm X-ray machine is calculated with the PNP (Perspective-n-Point) algorithm according to the lateral two-dimensional image of the C-arm X-ray machine. In some specific embodiments, the current object posture is the target object posture, a first virtual object posture is generated according to the target object posture and the initial lateral posture of the C-arm X-ray machine, and a first virtual lateral two-dimensional image corresponding to the first virtual object posture is generated with the DRR method. A first degree of similarity between the first virtual lateral two-dimensional image and the lateral two-dimensional image is calculated, and optionally, a degree of similarity is calculated with a normalized cross-correlation method.

The normalized cross-correlation (NCC) method is a commonly used cost function, which is highly robust for the scaling and translation of distribution. In this method, a mean and a standard deviation of the image are calculated first.

The mean and variance of an image K are defined as follows:

$$\mu(K) = \frac{1}{|\Omega|}\sum_{p} K(p) \tag{1}$$

$$\sigma(K) = \sqrt{\frac{1}{|\Omega|-1}\sum_{p\in\Omega}(K(p)-\mu(K))} \tag{2}$$

Where μ is the mean, σ is the variance, is the total number of pixels, K(p) is the size of image pixels, and p represents the position of a pixel point in the image, which may be expressed by two-dimensional coordinates (u, v).

Thus, NCC is calculated as follows:

$$S_{NCC}(I, J; T) = \frac{1}{\Omega_I}\sum_{p\in\Omega_I}\frac{(I(p)-\mu_I)(J(T^{-1}(p))-\mu_{J'})}{\sigma_I\sigma_{J'}} \tag{3}$$

Wherein, I and J represent two images I and J respectively, and J' is an image in the same time domain space as image I, which is obtained by transforming the image J through a transformation T−1.

In order to make the registration process more stable and exclude the case that the value range of X-ray is different from the value range of DRR, in some specific embodiments, for the above two images I and J, first, two gradients in X direction and Y direction are solved by means of a Sobel operator, then the NCCs of the X gradient and Y gradient of the two images are calculated, and finally the two NCCs are summed as the degree of similarity between the images. Please see the following expression, in which S_GNCC is the NCC of the gradient images.

$$S_{GNCC}(I_1, I_2; c_r, c_c, r) = S_{NCC}(\nabla_X I_1, \nabla_X I_2; c_r, c_c, r) + S_{NCC}(\nabla_Y I_1, \nabla_Y I_2; c_r, c_c, r) \tag{4}$$

Where, S_GNCC is the sum of the NCCs of the X gradient and Y gradient of the two gradient images, Cr is the coordinate of the center position in the X direction, Cc is the coordinate of the center position in the Y direction, r is the radius, S_GNCC (I1, I2, Cr, Cc, r) is the degree of similarity of a square area with Cr and Cc as the center and 2r as the side length, and I1 and I2 represent two images in the same coordinate system. Optionally, I1 is image I, and I2 is image J'.

In addition, in view that the result should not deviate too far from the initial value to avoid unpredictable extreme situations, in some embodiments, a regularization method is further used in the present application to prevent such situations. The regularization equation is as follows:

$$\log\left(\sqrt{2\sigma^2\pi}\right) - \log(\text{Folded} - Norm(x)) \tag{5}$$

Where σ is the variance of translation or rotation, and Folded-Norm refers to the normal distribution of translation; in this embodiment of the present application, the parameters are selected as follows: translation: 50 mm; rotation: 60 degrees.

$$f_Y(x; \mu, \sigma^2) = \frac{1}{\sqrt{2\pi\sigma^2}}e^{-\frac{(x-\mu)^2}{2\sigma^2}} + \frac{1}{\sqrt{2\pi\sigma^2}}e^{-\frac{(x+\mu)^2}{2\sigma^2}} \tag{6}$$

This equation ensures that the regularization function has a high value when the independent variable is greater than the variance.

The final similarity expression is as follows:

$$\min_{\theta\in SE(3)} \lambda S(\mathcal{P}(I;\theta), J) + (1-\lambda)\mathcal{R}(\theta), \tag{7}$$

Where SE(3) is a three-dimensional special Euclidean group of rigid body transformation motions (rotation and translation), and θ is the posture change in a Euclidean space; S is the similarity calculation formula, R is the function of θ (posture change) in the Euclidean space, and λ is an adjustable superderivative, usually with a weight of 0.1; P(I; θ) is a two-dimensional projection of the three-dimensional image I after a transformation of θ.

In some specific embodiments, if the first degree of similarity meets the first object posture condition, the current object posture is taken as the first virtual object posture. Optionally, the first object posture condition is that a difference between two adjacent iterations of the first degree of similarity is greater than a preset threshold of first degree of similarity.

S205: adjusting the current object posture and returning to step S202 if the first degree of similarity doesn't meet the first object posture condition.

In some specific embodiments, if the first degree of similarity doesn't meet the first object posture condition, the object posture of the object to be registered is rotated or translated. In some specific embodiments, the posture of the object to be registered is adjusted by means of a two-step method, i.e., a low-resolution image is adjusted first, then a high-resolution image is used, the low-resolution image is adjusted with a covariance matrix adaptive evolutionary strategy optimizer, and the high-resolution image is adjusted with a fast gradient-independent optimization algorithm. The specific steps of the two-stage method are as follows:

In a first stage, in some specific embodiments, an image with a fixed resolution of 256×256 pixels is selected, and a covariance matrix adaptive evolutionary strategy optimizer (CMA-ES) is used. The advantages of this optimizer lie in that it is unnecessary to calculate a gradient equation of loss function, the optimization effect is very good, and the optimizer employs an algorithm that is the least sensitive to the initial value among modern optimizers. However, this optimizer has a very slow speed because the loss function has to be calculated for many times in each cycle of iteration. The CMA-ES algorithm requires inputs of an initial value of the equation to be optimized, an optimization parameter sequence and a variance of each parameter.

In some specific embodiments, the initial value of the equation to be optimized used by the CMA-ES algorithm is the transformation matrix of initial posture from the patient coordinate system to the CT coordinate system solved with the PNP algorithm; the optimization parameter list includes six degrees of freedom (6DOF) of translation and rotation of the object to be registered (6 parameters); translation variances (5 mm for XYZ input variances); three rotation variances (15 degrees); and 100 CMA-ES samples in each cycle.

In a second stage, in some specific embodiments, ½ down-sampled image size is used for the image for registration optimization; however, if the resolution is lower than 256 pixels, the original X-ray image size is directly used. In that case, a slow evolutionary algorithm can't be used as the optimizer; however, for the convenience of solution, a gradient-independent optimization algorithm is still needed. For example, BOBYQA, NEWUOA, etc. can be used, because they are optimizers that do not require calculating a loss function heavily in each iteration.

In some specific embodiments, if the first degree of similarity doesn't meet the first object posture condition, the current object posture is adjusted, and the process returns to step S202 to regenerate a corresponding virtual two-dimensional image and calculate the first degree of similarity.

Figure 3:
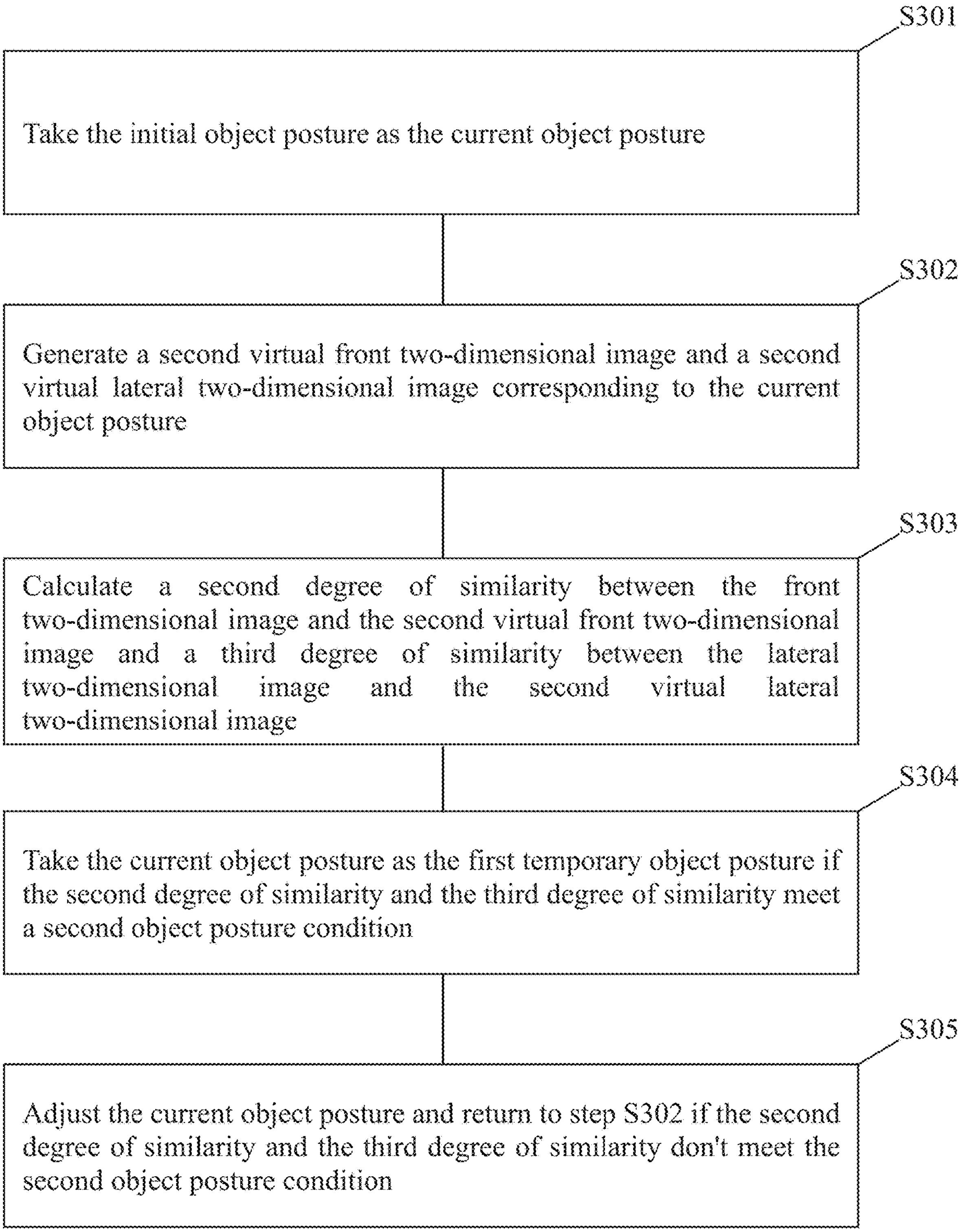
FIG. 3 is a flowchart of generating a first temporary object posture according to the initial object posture, the front two-dimensional image and the lateral two-dimensional image in the image registration method in the present application.

FIG. 3 is a flowchart of generating a first temporary object posture according to the initial object posture, the front two-dimensional image and the lateral two-dimensional image in the image registration method in the present application. As shown in FIG. 3, generating a first temporary object posture according to the initial object posture, the front two-dimensional image and the lateral two-dimensional image comprises the following steps:

- S301: taking the initial object posture as the current object posture;
- S302: generating a second virtual front two-dimensional image and a second virtual lateral two-dimensional image corresponding to the current object posture;
- S303: calculating a second degree of similarity between the front two-dimensional image and the second virtual front two-dimensional image and a third degree of similarity between the lateral two-dimensional image and the second virtual lateral two-dimensional image;
- S304: taking the current object posture as the first temporary object posture if the second degree of similarity and the third degree of similarity meet a second object posture condition;

In some specific embodiments, the current object posture is the initial object posture, and a second virtual front two-dimensional image and a second virtual lateral two-dimensional image corresponding to the initial object posture are generated with the DRR method. In some specific embodiments, a second degree of similarity between the second virtual front two-dimensional image and the front two-dimensional image is calculated, and a third degree of similarity between the second virtual lateral two-dimensional image and the lateral two-dimensional image is calculated. Optionally, the degrees of similarity are calculated with the normalized cross-correlation method. In some specific embodiments, if the second degree of similarity and the third degree of similarity meet a second object posture condition, the current object posture is taken as a first temporary object posture. Optionally, the second object posture condition is that a difference between two adjacent iterations of the second degree of similarity is greater than a preset threshold of second degree of similarity and a difference between two adjacent iterations of the third degree of similarity is greater than a preset threshold of third degree of similarity.

S305: adjusting the current object posture and returning to step S302 if the second degree of similarity and the third degree of similarity don't meet the second object posture condition.

In some specific embodiments, if the second degree of similarity and the third degree of similarity don't meet the second object posture condition, the posture of the object to be registered is rotated or translated. Optionally, the posture of the object to be registered is adjusted by means of a two-step method, i.e., a low-resolution image is adjusted first, then a high-resolution image is used, the low-resolution image is adjusted with a covariance matrix adaptive evolutionary strategy optimizer, and the high-resolution image is adjusted with a fast gradient-independent optimization algorithm. In some specific embodiments, if the second degree of similarity and the third degree of similarity don't meet the second object posture condition, the current object posture is adjusted, and the process returns to the step S302 to regenerate a corresponding virtual two-dimensional image and calculate the second degree of similarity and the third degree of similarity.

Figure 4:
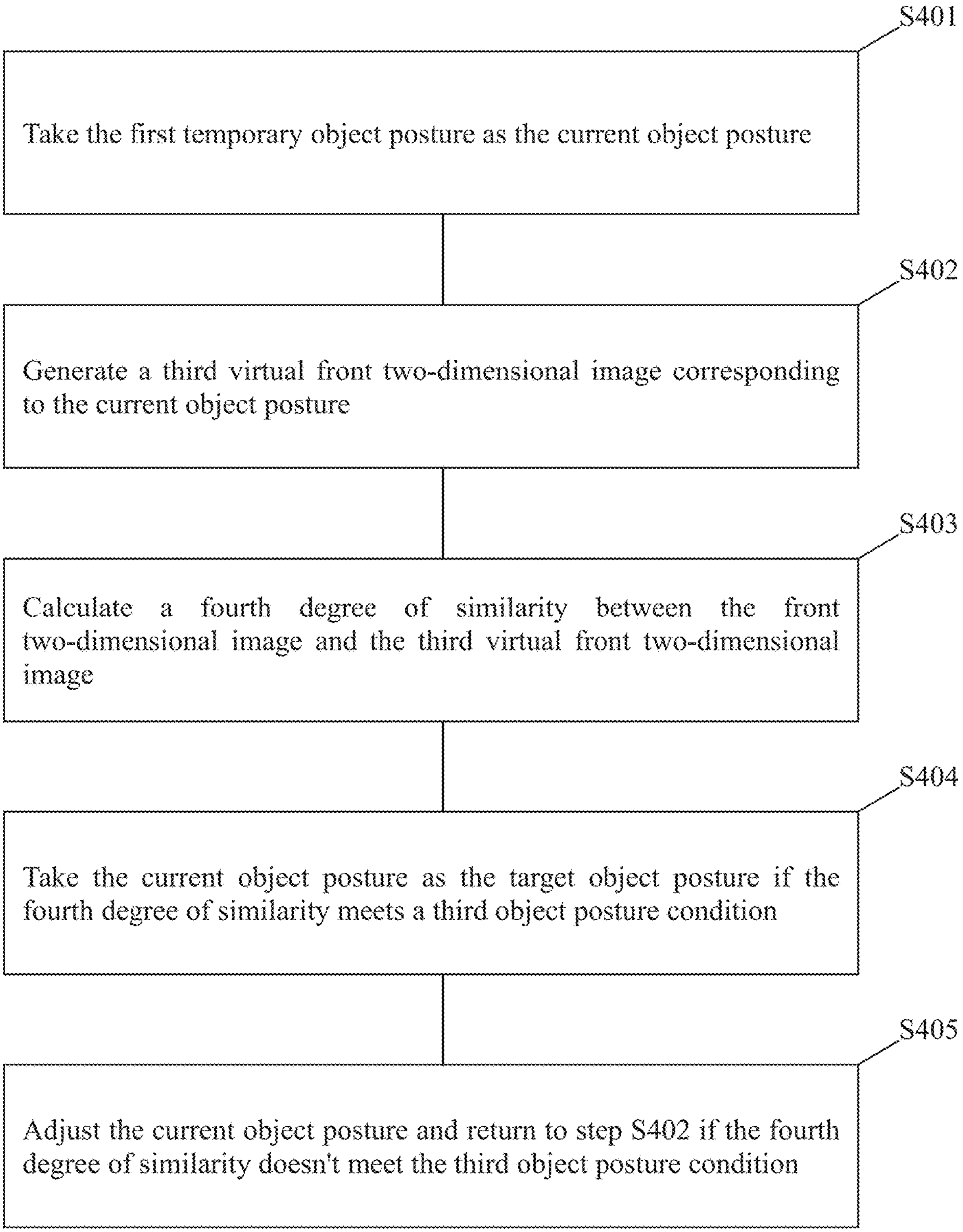
FIG. 4 is a flowchart of generating a target object posture according to the first temporary object posture and the front two-dimensional image in the image registration method in the present application.

FIG. 4 is a flowchart of generating a target object posture according to the first temporary object posture and the front two-dimensional image in the image registration method in the present application. As shown in FIG. 4, generating a target object posture according to the first temporary object posture and the front two-dimensional image comprises the following steps.

- S401: taking the first temporary object posture as the current object posture;
- S402: generating a third virtual front two-dimensional image corresponding to the current object posture;
- S403: calculating a fourth degree of similarity between the front two-dimensional image and the third virtual front two-dimensional image;
- S404: taking the current object posture as the target object posture if the fourth degree of similarity meets a third object posture condition;

In some specific embodiments, the current object posture is the first temporary object posture, a third virtual front two-dimensional image corresponding to the first temporary object posture is generated with the DRR method, and a fourth degree of similarity between the third virtual front two-dimensional image and the front two-dimensional image is calculated. Optionally, the degrees of similarity are calculated with the normalized cross-correlation method. In some specific embodiments, if the fourth degree of similarity meets a third object posture condition, the current object posture is taken as the target object posture. Optionally, the third object posture condition is that a difference between two adjacent iterations of the fourth degree of similarity is greater than a preset threshold of fourth degree of similarity.

S405: adjusting the current object posture and returning to step S402 if the fourth degree of similarity doesn't meet the third object posture condition.

In some specific embodiments, if the fourth degree of similarity doesn't meet the third object posture condition, the posture of the object to be registered is adjusted by rotation or translation. Optionally, the posture of the object to be registered is adjusted by means of a two-step method, i.e., a low-resolution image is adjusted first, then a high-resolution image is used, the low-resolution image is adjusted with a covariance matrix adaptive evolutionary strategy optimizer, and the high-resolution image is adjusted with a fast gradient-independent optimization algorithm. In some specific embodiments, if the fourth degree of similarity doesn't meet the third object posture condition, the current object posture is adjusted, and the process returns to the step S402 to regenerate a corresponding virtual two-dimensional image and calculate the fourth degree of similarity.

Figure 5:
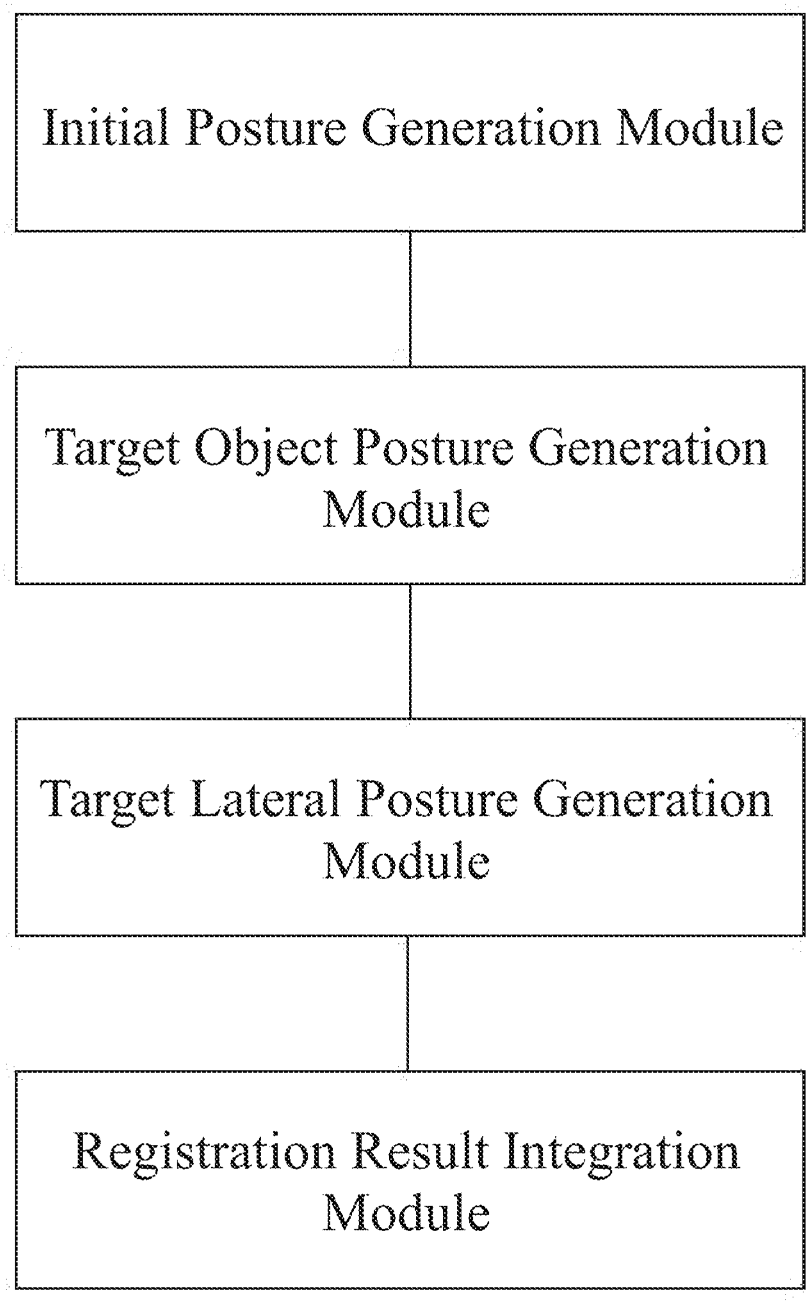
FIG. 5 is a schematic diagram of an image registration device in the present application.

FIG. 5 is a schematic diagram of an image registration device in the present application. As shown in FIG. 5, the device comprises an initial posture generation module, a target object posture generation module, a target lateral posture generation module, and a registration result integration module.

In FIG. 5, the initial posture generation module generates an initial object posture of the object to be registered, an initial front posture and an initial lateral posture of the C-arm X-ray machine according to the three-dimensional image, the front two-dimensional image and the lateral two-dimensional image of the object to be registered, and the internal parameters of the C-arm X-ray machine.

In some specific embodiments, the three-dimensional image is a three-dimensional CT image taken before the surgery. The three-dimensional image includes a named field of the object to be registered and corresponding three-dimensional image guidance information, wherein the coordinates of points in the three-dimensional image are in a CT image coordinate system. In some specific embodiments, the two-dimensional images are X-ray images taken by the C-arm X-ray machine during the surgery. The front two-dimensional image and the lateral two-dimensional image include a corresponding naming field and two-dimensional image guidance information of the object to be registered in a front position and a lateral position respectively, wherein the coordinates of points in the front two-dimensional image and the lateral two-dimensional image are in an X-ray two-dimensional coordinate system. In some specific embodiments, the object posture of the object to be registered is a transformation matrix of the coordinates of the object to be registered from a CT image coordinate system to a patient coordinate system.

In some specific embodiments, the C-arm X-ray machine is used to take a front two-dimensional image and a lateral two-dimensional image during the operation. The internal parameters of the C-arm X-ray machine include a focal length of the C-arm, and horizontal and vertical coordinates of a viewpoint center of the C-arm in the X-ray image taken, wherein the horizontal and vertical coordinates refer to the coordinates in the X-ray two-dimensional coordinate system. In some specific embodiments, external parameters of the C-arm X-ray machine are calculated with a PNP (Perspective-n-Point) algorithm according to the three-dimensional image, the front two-dimensional image, the lateral two-dimensional image, and the internal parameters of the C-arm X-ray machine, and the external parameters of the C-arm X-ray machine include an initial front posture and an initial lateral posture of the C-arm X-ray machine. In some specific embodiments, a transformation matrix from the CT image coordinate system to the three-dimensional coordinate system of the X-ray machine is determined according to the three-dimensional image guidance information and the two-dimensional image guidance information of the object to be registered. In some specific embodiments, an initial object posture of the object to be registered is obtained according to the transformation matrix from the CT image coordinate system to the three-dimensional coordinate system of the X-ray machine, the external parameters of the C-arm X-ray machine, and the internal parameters of the C-arm X-ray machine.

In FIG. 5, the target object posture generation module performs registration optimization for the initial object posture according to the front two-dimensional image and the lateral two-dimensional image to generate a target object posture of the object to be registered.

In some specific embodiments, a first temporary object posture is generated according to the initial object posture, the front two-dimensional image and the lateral two-dimensional image, and a virtual front two-dimensional image and a virtual lateral two-dimensional image corresponding to the initial object posture are generated with a DRR (Digitally Reconstructed Radio-Graphs) method. The DRR method is realized specifically by means of line integral. In some specific embodiments, a second degree of similarity between the virtual front two-dimensional image and the front two-dimensional image that are generated with the DRR method and a third degree of similarity between the virtual lateral two-dimensional image and the lateral two-dimensional image are calculated. In some specific embodiments, if the second degree of similarity and the third degree of similarity don't meet a second object posture condition, the object posture is adjusted, and a virtual front two-dimensional image and a virtual lateral two-dimensional image corresponding to the adjusted object posture are regenerated, and the degrees of similarity are recalculated; in some specific embodiments, if the second degree of similarity and the third degree of similarity meet a second object posture condition, the current object posture of the object to be registered is taken as a first temporary object posture. Optionally, the second object posture condition is that a difference between two adjacent iterations of the second degree of similarity is greater than a preset threshold of second degree of similarity and a difference between two adjacent iterations of the third degree of similarity is greater than a preset threshold of third degree of similarity.

In some specific embodiments, a target object posture is generated according to the first temporary object posture and the front two-dimensional image. A third virtual front two-dimensional image corresponding to the first temporary object posture is generated with the DRR method, and a fourth degree of similarity between the third virtual front two-dimensional image and the front two-dimensional image is calculated. In some specific embodiments, if the fourth degree of similarity doesn't meet a third object posture condition, the first temporary object posture is adjusted, a third virtual front two-dimensional image corresponding to the adjusted first temporary object posture is regenerated, and a fourth degree of similarity between the adjusted third virtual front two-dimensional image and the front two-dimensional image is calculated; if the fourth degree of similarity meets the third object posture condition, the current first temporary object posture is taken as the target object posture. Optionally, the third object posture condition is that a difference between two adjacent iterations of the fourth degree of similarity is greater than a preset threshold of fourth degree of similarity.

In FIG. 5, the target lateral posture generation module performs registration optimization for the initial lateral posture of the C-arm X-ray machine according to the target object posture and the lateral two-dimensional image to generate a registered target lateral posture of the C-arm X-ray machine.

In some specific embodiments, an initial lateral posture of the C-arm X-ray machine is calculated with the PNP (Perspective-n-Point) algorithm according to the lateral two-dimensional image of the C-arm X-ray machine. A first virtual object posture is generated according to the target object posture and the initial lateral posture of the C-arm X-ray machine, a first virtual lateral two-dimensional image corresponding to the first target object posture is generated with the DRR method, and a first degree of similarity between the first virtual lateral two-dimensional image and the lateral two-dimensional image is calculated. In some specific embodiments, if the first degree of similarity doesn't meet a first object posture condition, the target object posture is adjusted, a first virtual lateral two-dimensional image corresponding to the adjusted target object posture is regenerated, and a first degree of similarity between the adjusted first virtual lateral two-dimensional image and the lateral two-dimensional image is calculated; in some specific embodiments, if the first degree of similarity meets the first object posture condition, the current object posture is taken as the first virtual object posture. Optionally, the first object posture condition is that a difference between two adjacent iterations of the first degree of similarity is greater than a preset threshold of first degree of similarity.

In some specific embodiments, a registered target lateral posture is generated according to a relative position relation between the first virtual object posture and the lateral two-dimensional image, a first transitional posture is generated according to the first virtual object posture, and an inversion operation is performed on the first virtual object posture, and the obtained inversion is taken as the first transitional posture.

In some specific embodiments, an initial lateral posture of the C-arm X-ray machine is calculated with the PNP algorithm, and the first transitional posture is multiplied by the current initial lateral posture of the C-arm X-ray machine to obtain a registered target lateral posture of the C-arm X-ray machine. In some specific embodiments, there is a relative position relation between the first virtual object posture and the initial lateral posture. The lateral posture of the C-arm X-ray machine is calculated when the object posture remains the target posture according to the relative position relation, and the current lateral posture is determined as the target lateral posture of the C-arm X-ray machine.

In FIG. 5, the registration result optimization module integrates the target object posture of the object to be registered, the target lateral posture of the C-arm X-ray machine, and the initial front posture of the C-arm X-ray machine into a registration optimization result.

In some specific embodiments, the target object posture of the object to be registered is the transformation matrix of coordinates from the CT image coordinate system to the patient coordinate system after registration optimization. The target lateral posture and the initial front posture of the C-arm X-ray machine are the transformation matrix of coordinates from the patient coordinate system to the three-dimensional coordinate system of the X-ray machine after registration optimization. In some specific embodiments, the registration result integration module integrates the target object posture of the object to be registered, the target lateral posture of the C-arm X-ray machine, and the initial front posture of the C-arm X-ray machine to generate a registration optimization result, and provides the registration optimization result for the follow-up operator to operate.

Figure 6:
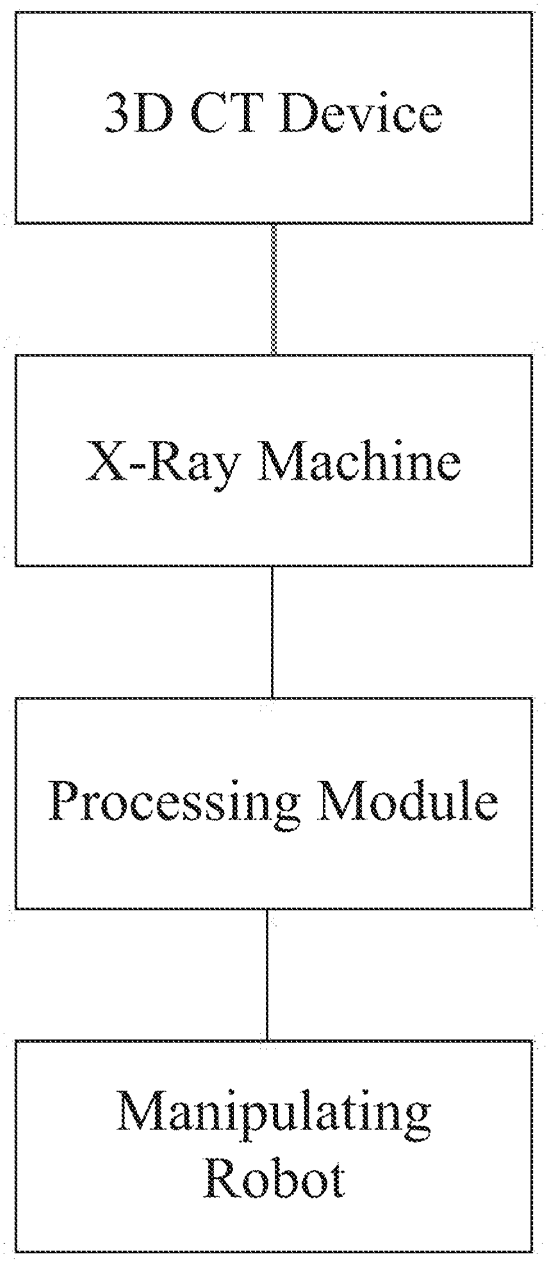
FIG. 6 is a schematic diagram of an orthopedic surgery navigation system based on image registration in the present application.

FIG. 6 is a schematic diagram of an orthopedic surgery navigation system based on image registration in the present application. As shown in FIG. 6, the orthopedic surgery navigation system based on image registration comprises a three-dimensional CT device, an X-ray machine, a processing module and a manipulating robot.

In some specific embodiments, in FIG. 6, the X-ray machine is a C-arm X-ray machine. The system shown in FIG. 6 will be described in detail in an example of a C-arm X-ray machine.

As shown in FIG. 6, in some specific embodiments, the three-dimensional CT device is used to take a three-dimensional image of a site to be operated before the operation; the C-arm X-ray machine is used to take a front two-dimensional image and a lateral two-dimensional image of the site to be operated during the operation; the processing module is used to determine a surgical operation plan according to the three-dimensional image; in some specific embodiments, the processing module is further used to use to method shown in FIG. 1 to generate a registration optimization result according to the three-dimensional image, the front two-dimensional image, the lateral two-dimensional image, and the internal parameters of the C-arm X-ray machine, wherein the registration optimization result includes a target object posture of the object to be registered, a target lateral posture of the C-arm X-ray machine, and an initial front posture of the C-arm X-ray machine; the processing module is further used to transform coordinates of the surgical operation plan from a CT image coordinate system to a patient coordinate system according to the target object posture; transform the coordinates of the surgical operation plan from the patient coordinate system to a three-dimensional coordinate system of the X-ray machine according to the target lateral posture and the initial front posture; and transform the coordinates of the surgical operation plan from the three-dimensional coordinate system of the C-arm X-ray machine to a front X-ray two-dimensional coordinate system and a lateral X-ray two-dimensional coordinate system according to the internal parameters of the C-arm X-ray machine; the manipulating robot is used to manipulate the site to be operated according to the surgical operation plan.

In some specific embodiments, the site to be operated is the spine, and the process of performing orthopedic surgery navigation with the system shown in FIG. 6 is as follows:

Before the operation, a three-dimensional image of the spine to be operated is taken with the three-dimensional CT device. The processing module determines a surgical operation plan for the spine to be operated according to the three-dimensional image. Optionally, the surgical operation plan includes the position of a pedicle screw for each vertebral segment in the spine to be operated.

During the operation, the C-arm X-ray machine takes a front two-dimensional image and a lateral two-dimensional image of the spine to be operated. The processing module generates a target object posture of the vertebral body to be operated and a target lateral posture of the C-arm according to the method shown in FIG. 1. The processing module transforms the surgical operation plan from the CT coordinate system to the patient coordinate system via the target object posture. The processing module then uses the internal parameters and external parameters of the C-arm X-ray machine to project the surgical operation plan in the patient coordinate system onto the X-ray machine for display. The manipulating robot manipulates the spine to be operated according to the surgical operation plan displayed on the X-ray machine. Optionally, the manipulating robot fixes pedicle screws at positions scheduled in the surgical operation plan.

Figure 7:
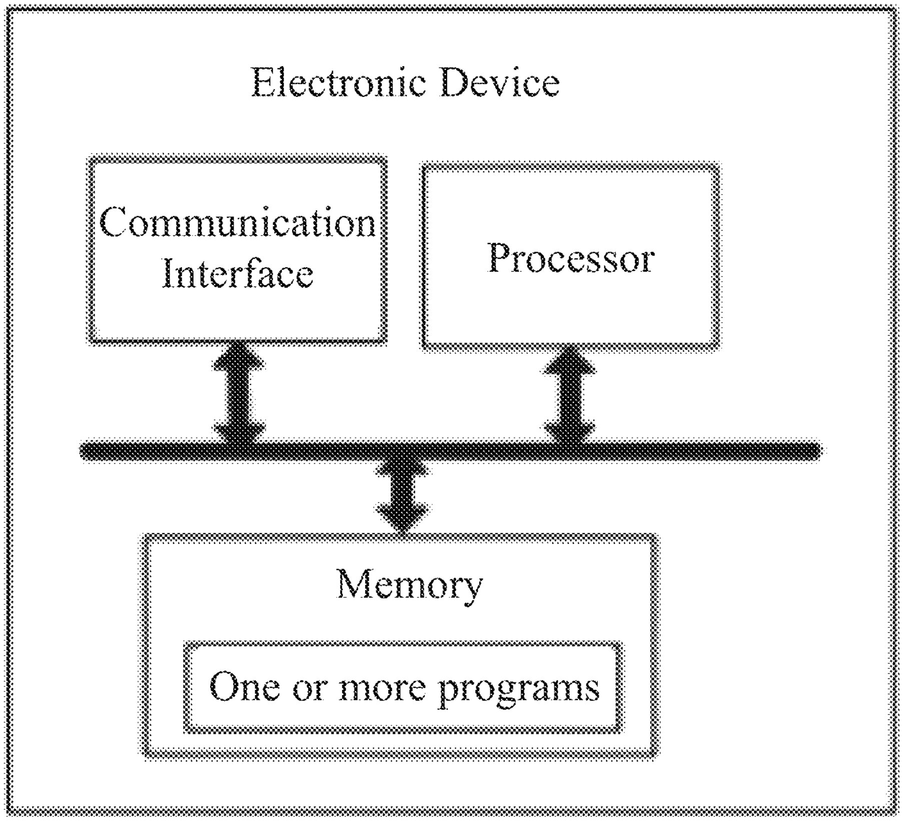
FIG. 7 is a structural diagram of an electronic device in the present application.

FIG. 7 is a structural diagram of an electronic device provided by the present application. The electronic device comprises a processor and a memory. The memory stores computer instructions, which, when executed by the processor, instruct the processor to execute the computer instructions so as to implement the method and detailed scheme as shown in FIG. 1.

It should be understood that the above device embodiment is only exemplary, and the device disclosed in the present disclosure may be implemented in other ways. For example, the division of the units/modules in the above embodiment is only a logical function division, and other division methods may also be possible in actual implementation. For example, a plurality of units, modules or components may be combined or integrated into another system, or some features may be omitted or excluded from the execution.

In addition, unless otherwise specified, the functional units/modules in each embodiment in the present disclosure may be integrated into one unit/module, or the units/modules may exist separately physically, or more than two units/modules may be integrated together. The above-mentioned integrated units/modules may be implemented in the form of hardware or in the form of software program modules.

If the integrated unit/module is implemented in the form of hardware, the hardware may be digital circuits or analog circuits, etc. The physical implementation of hardware structures includes, but is not limited to, transistors, memristors, etc. Unless otherwise specified, the processor or chip may be any suitable hardware processor, such as CPU, GPU, FPGA, DSP and ASIC. Unless otherwise specified, the on-chip cache, off-chip memory and storage may be any suitable magnetic storage medium or magneto-optical storage medium, such as RRAM (Resistive Random-Access Memory), DRAM (Dynamic Random-Access Memory), SRAM (Static Random-Access Memory), EDRAM (Enhanced Dynamic Random-Access Memory, HBM (High-Bandwidth Memory), HMC (Hybrid Memory Cube), etc.

If the integrated unit/module is implemented in the form of a software program module and sold or used as an independent product, it may be stored in a computer-readable memory. Based on that understanding, the essential technical scheme of the present disclosure, parts of the technical scheme that make contributions to the prior art, or the technical scheme in part or in entirety, may be embodied in the form of a software product, which is stored in a memory and includes several instructions to instruct a computer device (e.g., a personal computer, a server, or a network device, etc.) to execute all or part of the steps of the method described in various embodiments of the present disclosure. The aforementioned memory includes: U disk, ROM (Read-Only Memory), RAM (Random Access Memory), removable hard disk, magnetic disk or optical disk, and other media that can store program codes.

In an embodiment of the present application, a non-transitory computer storage medium is further provided. The non-transitory computer storage medium stores a computer program, which, when executed by a plurality of processors, instructs the processors to execute the method and detailed scheme shown in FIG. 1.

While the embodiments of the present application and the principle of the present application are described in detail above in examples, it should be appreciated that those embodiments are only intended to facilitate understanding the method and core idea of the present application. Besides, those skilled in the art can make various modifications or variations according to the idea of the present application and based on the specific embodiments and application scope of the present application; however, all such modifications or variations shall be deemed as falling in the scope of protection of the present application. In conclusion, the content of this specification should not be construed as limiting the present application.

What is claimed is:

1. An image registration method, comprising:

generating an initial object posture of an object to be registered, and an initial front posture and an initial lateral posture of an X-ray machine according to a three-dimensional image, a front two-dimensional image and a lateral two-dimensional image of the object to be registered and internal parameters of the X-ray machine;

performing registration optimization for the initial object posture according to the front two-dimensional image and the lateral two-dimensional image to generate a target object posture of the object to be registered;

performing registration optimization for the initial lateral posture of the X-ray machine according to the target object posture and the lateral two-dimensional image to generate a registered target lateral posture of the X-ray machine; and integrating the target object posture of the object to be registered, the registered target lateral posture of the X-ray machine, and the initial front posture of the X-ray machine into a registration optimization result.

2. The image registration method according to claim 1, wherein performing registration optimization for the initial lateral posture of the X-ray machine according to the target object posture and the lateral two-dimensional image to generate a registered target lateral posture of the X-ray machine comprises:

generating a first virtual object posture according to the target object posture and the lateral two-dimensional image; and generating the registered target lateral posture of the X-ray machine according to a relative position relation between the first virtual object posture and the lateral two-dimensional image.

3. The image registration method according to claim 2, wherein generating the registered target lateral posture of the X-ray machine according to a relative position relation between the first virtual object posture and the lateral two-dimensional image comprises:

generating a first transitional posture according to the first virtual object posture; and obtaining the registered target lateral posture of the X-ray machine according to the first transitional posture and a current initial lateral posture of the X-ray machine.

4. The image registration method according to claim 2, wherein generating a first virtual object posture according to the target object posture and the lateral two-dimensional image comprises:

S201: taking the target object posture as a current object posture;

S202: generating a first virtual lateral two-dimensional image corresponding to the current object posture;

S203: calculating a first degree of similarity between the lateral two-dimensional image and the first virtual lateral two-dimensional image;

S204: taking the current object posture as the first virtual object posture if the first degree of similarity meets a first object posture condition; and

S205: adjusting the current object posture and returning to step S202 if the first degree of similarity doesn't meet the first object posture condition.

5. The image registration method according to claim 1, wherein performing registration optimization for the initial object posture according to the front two-dimensional image and the lateral two-dimensional image to generate a target object posture of the object to be registered comprises:

generating a first temporary object posture according to the initial object posture, the front two-dimensional image and the lateral two-dimensional image; and generating the target object posture according to the first temporary object posture and the front two-dimensional image.

6. The image registration method according to claim 5, wherein generating a first temporary object posture according to the initial object posture, the front two-dimensional image and the lateral two-dimensional image comprises:

S301: taking the initial object posture as a current object posture;

S302: generating a second virtual front two-dimensional image and a second virtual lateral two-dimensional image corresponding to the current object posture;

S303: calculating a second degree of similarity between the front two-dimensional image and the second virtual front two-dimensional image and a third degree of similarity between the lateral two-dimensional image and the second virtual lateral two-dimensional image;

S304: taking the current object posture as the first temporary object posture if the second degree of similarity and the third degree of similarity meet a second object posture condition; and S305: adjusting the current object posture and returning to step S302 if the second degree of similarity and the third degree of similarity don't meet the second object posture condition.

7. The image registration method according to claim 5, wherein generating the target object posture according to the first temporary object posture and the front two-dimensional image comprises:

S401: taking the first temporary object posture as a current object posture;

S402: generating a third virtual front two-dimensional image corresponding to the current object posture;

S403: calculating a fourth degree of similarity between the front two-dimensional image and the third virtual front two-dimensional image;

S404: taking the current object posture as the target object posture if the fourth degree of similarity meets a third object posture condition; and S405: adjusting the current object posture and returning to step S402 if the fourth degree of similarity doesn't meet the third object posture condition.

8. The image registration method according to claim 4, wherein adjusting the object posture comprises:

performing a rotating or translating manipulation on the posture of the object to be registered.

9. The image registration method according to claim 6, wherein adjusting the object posture comprises:

performing a rotating or translating manipulation on the posture of the object to be registered.

10. The image registration method according to claim 7, wherein adjusting the object posture comprises:

performing a rotating or translating manipulation on the posture of the object to be registered.

11. An orthopedic surgery navigation system based on image registration, comprising:

a three-dimensional CT device configured for taking a three-dimensional image of a site to be operated;

an X-ray machine configured for taking a front two-dimensional image and a lateral two-dimensional image of the site to be operated and providing internal parameters of the X-ray machine to a processing module;

the processing module configured for determining a surgical operation plan according to the three-dimensional image, generating a registration optimization result according to the three-dimensional image, the front two-dimensional image, the lateral two-dimensional image and the internal parameters of the X-ray machine, wherein the registration optimization result includes a target object posture of the object to be registered, a target lateral posture of the X-ray machine and an initial front posture of the X-ray machine; transforming coordinates of the surgical operation plan from a CT image coordinate system to a patient coordinate system according to the target object posture; transforming the coordinates of the surgical operation plan from the patient coordinate system to a three-dimensional coordinate system of the X-ray machine according to the target lateral posture and the initial front posture; and transforming the coordinates of the surgical operation plan from the three-dimensional coordinate system of the X-ray machine according to a front X-ray two-dimensional coordinate system and a lateral X-ray two-dimensional coordinate system according to the internal parameters of the X-ray machine; and a manipulating robot configured for manipulating the site to be operated according to the surgical operation plan;

wherein the processing module is a processer of the orthopedic surgery navigation system.

* * * * *